United States Patent [19]

Tamai et al.

[11] 4,440,339

[45] Apr. 3, 1984

[54] METHOD OF REPAIRING HOUSING OF CONTROL ROD DRIVING SYSTEM

[75] Inventors: Yasumasa Tamai; Takaichi Koyama, both of Hitachi, Japan

[73] Assignee: Hitachi, Ltd., Tokyo, Japan

[21] Appl. No.: 272,882

[22] Filed: Jun. 12, 1981

[30] Foreign Application Priority Data

Jun. 19, 1980 [JP] Japan .................. 55-83757

[51] Int. Cl.³ ............................................ B23K 31/06
[52] U.S. Cl. .................. 228/119; 228/170; 228/29; 228/263.15; 138/97
[58] Field of Search ................ 228/29, 119, 170, 183, 228/263; 138/97; 137/315

[56] References Cited

U.S. PATENT DOCUMENTS 2,050,326  8/1936  Hopkins .............................. 228/170
4,215,809  8/1980  Davis .................................. 228/119
4,216,893  8/1980  Glatthorn ........................... 228/119

Primary Examiner—Kenneth J. Ramsey
Assistant Examiner—Marc Hodak
Attorney, Agent, or Firm—Thomas E. Beall, Jr.

[57] ABSTRACT

A method of repairing the housing of a control rod driving system of a nuclear reactor, the housing being inserted through the wall of a pressure vessel of the reactor into a cylindrical sleeve secured to the inner surface of the vessel, which housing is jointed by welding to the cylindrical sleeve. The method comprises the steps of: cutting the housing in the circumferential direction of the housing at a position defined between the weld joint and the inner surface of the reactor vessel and surrounded by the cylindrical sleeve, thereby to divide the housing into a first housing part still attaching to the weld joint and another removable housing part; removing the removable other housing part; inserting a second housing part into said cylindrical sleeve through the wall of the nuclear reactor vessel; and uniting the first housing part and the second housing part by welding thereby to form a new housing for the control rod driving system.

9 Claims, 10 Drawing Figures

METHOD OF REPAIRING HOUSING OF CONTROL ROD DRIVING SYSTEM

The present invention relates to a method of repairing the housing of a control rod driving system.

Recently, the problem of stress corrosion cracking of austenite stainless steel pipe such as of AISI 304 has become noticeable in boiling water reactors, and various countermeasures have been taken to avoid the stress corrosion cracking.

Figure 1:
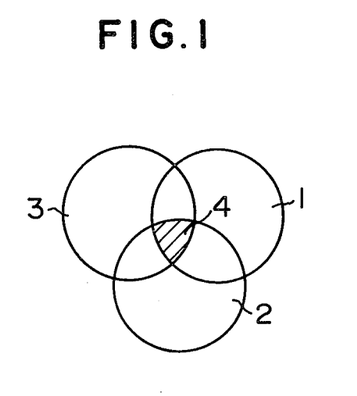
FIG. 1 is an illustration of the mechanism of generation of crystal grain boundary type stress corrosion cracking.

As will be seen from FIG. 1, the crystal grain boundary type stress corrosion cracking is generated in the heat affected zone (referred to as HAZ, hereinafter) of austenite stainless steel pipe when the following three conditions are met simultaneously. These conditions are: (1) presence of high tensile stress in excess of 0.2% yield strength; (2) generation of chromium lacking layer along the HAZ crystal boundary (this is referred to as sensitization) and (3) presence of corrosive environment such as dissolved oxygen. Namely, in FIG. 1, the hatched area 4 represents the region where the stress corrosion cracking takes place. In other words, the stress corrosion cracking does not take place when at least one of these three conditions is lacking.

Figure 2:
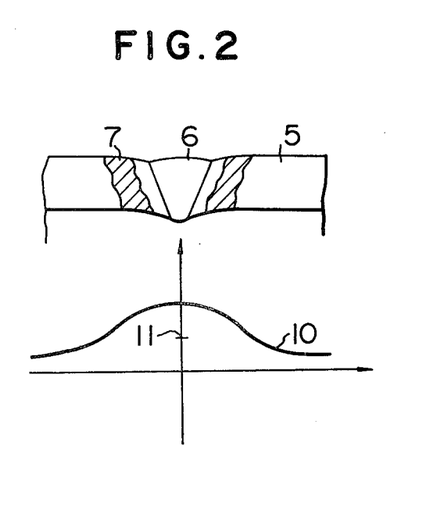
FIG. 2 is a characteristic chart showing the state of residual stress after the welding of the pipes.

The mechanism of the stress corrosion cracking will be described in more detail with reference to a piping by way of example. FIG. 2 illustrates the state of pipes made of an alloy having high carbon content such as AISI 304 stainless steel, welded to each other by natural cooling type welding in which no positive cooling such as filing of the pipe interior with water is adopted. After the welding, a high residual tensile stress (characteristic curve 10) of an order of several tens of Kg/mm$^2$ is generated in the inner surface of the welded pipes due to the thermal stress attributable to the temperature difference across the pipe wall and due to the angular distortion (shrinkage of pipe 5). The 0.2% yield strength is denoted at a numeral 11. At the same time, in the HAZ 7 near the weld joint 6, chromium is combined with carbon to form a chromium carbide to generate a chromium lacking layer. Such an AISI 304 stainless steel pipe is replaced with another stainless steel pipe having low carbon content or a pipe of ordinary carbon steel.

Usually, the housing of a control rod driving system (referred to a CRD housing, hereinafter) attached to the pressure vessel of a boiling water reactor is made of AISI 304 stainless steel pipe. Accordingly, there is a possibility of occurrence of stress corrosion cracking in the area near the weld joint between the pressure vessel and the CRD housing, if the aforementioned three conditions are caused simultaneously.

Therefore, it is planned to substitute a stainless steel pipe having low carbon content for the AISI 304 stainless steel CRD housing, before the stress corrosion cracking is generated in the latter.

In order to reduce the risk of radiation exposure of the workers, it is essential that the work for renewing or replacing the CRD housing is completed in a short period of time.

Accordingly, an object of the invention is to provide a method of repairing a CRD housing, which permits the renewal of the CRD housing in quite a short period of time.

Figure 3:
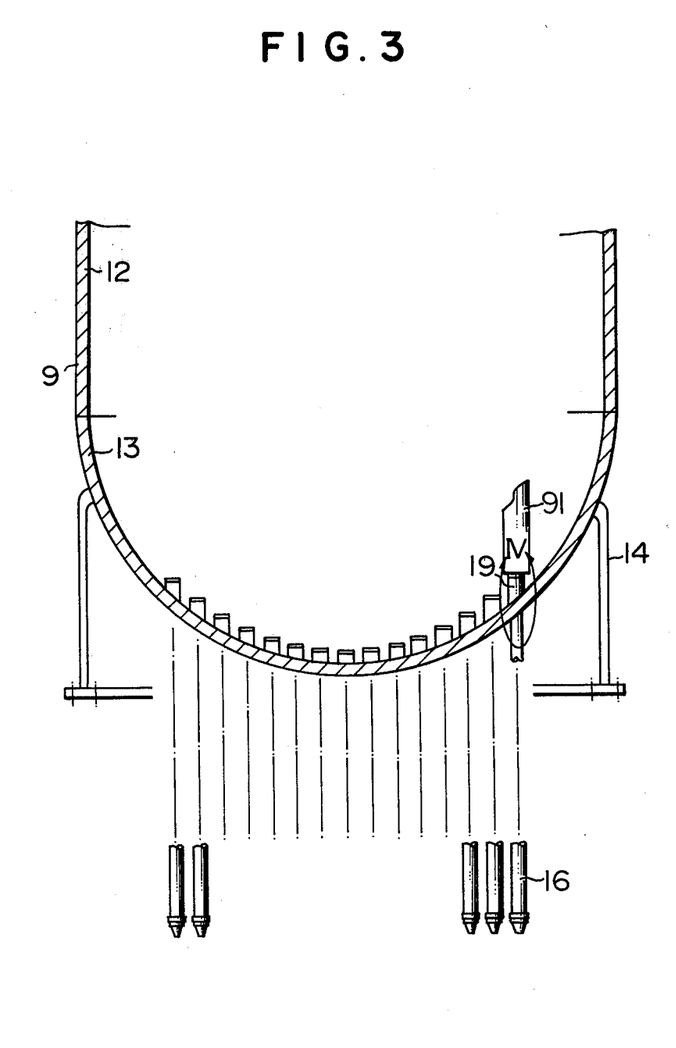
FIG. 3 shows the structure of the lower part of the pressure vessel of a boiling water reactor.
Figure 4:
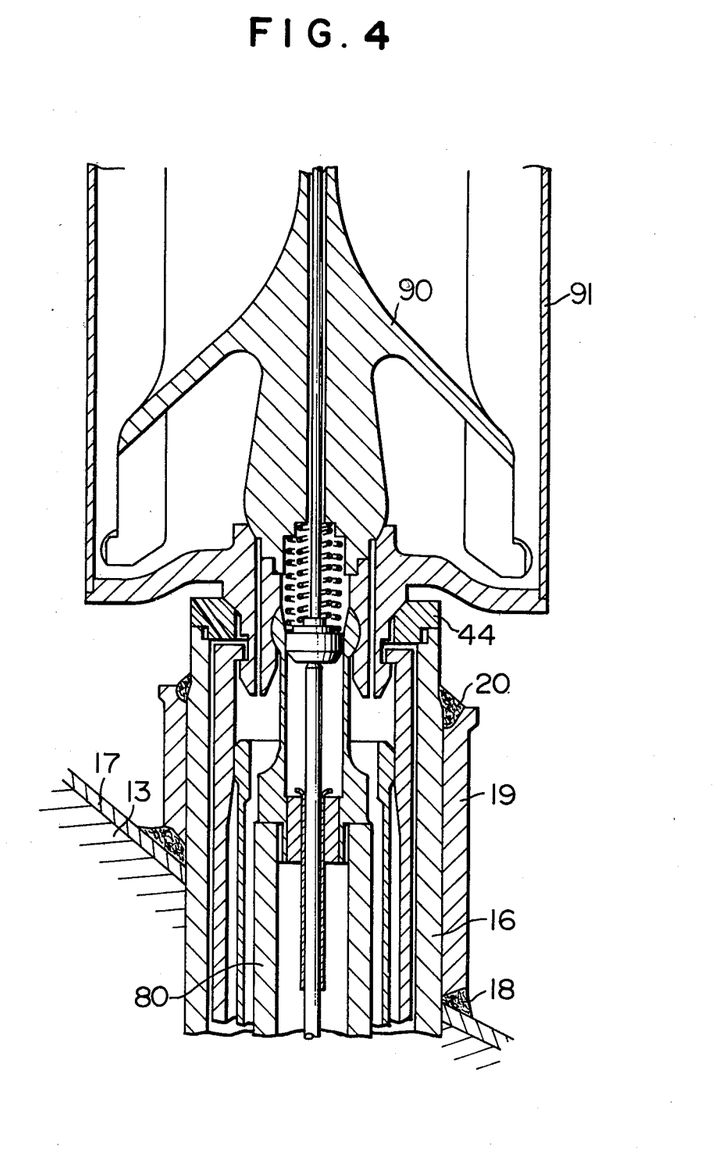
FIG. 4 is an enlarged sectional view of a portion designated at IV in FIG. 3.

Referring to the drawings, a pressure vessel 9 of a boiling water reactor has a cylindrical barrel 12, a lower end plate 13 and an upper lid which is not shown, as will be most clearly seen from FIG. 3. The pressure vessel 9 of the reactor is fixed, by means of a skirt 14, to a pedestal which is placed in a container of the reactor. A CRD housing 16 is fixed to the lower end plate 13 of the pressure vessel 9. FIG. 4 illustrates how the AISI 304 stainless steel CRD housing 16 is fixed. A stab tube 19 is fixed by means of an inconel welding 18 to a overlaid padding 17 of stainless steel on the inner surface of the lower end plate 13. The CRD housing 16 is inserted into the stab tube 19 through the lower end plate 13, and is fixed to the stab tube 19 by means of an inconel welding 20. A reference numeral 21 designates a sensitized region formed on the CRD housing 20 as a result of the inconel welding 16.

Figure 5:
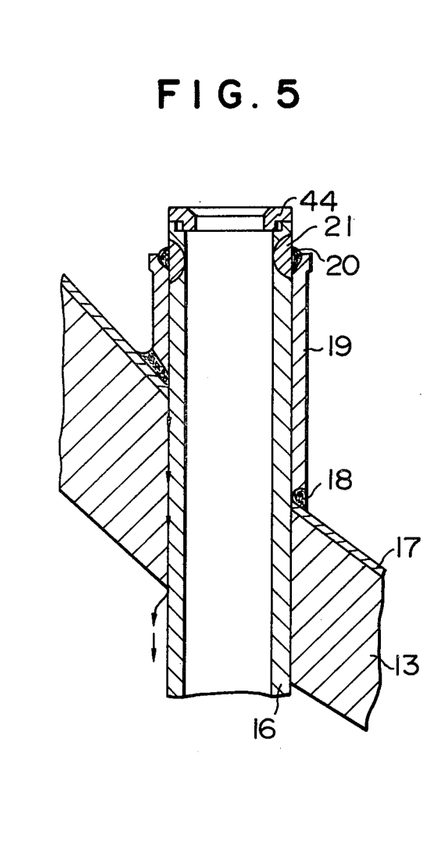
FIG. 5 is a sectional view of an essential part, showing the state before the replacement of the CRD housing shown in FIG. 4.
Figure 6:
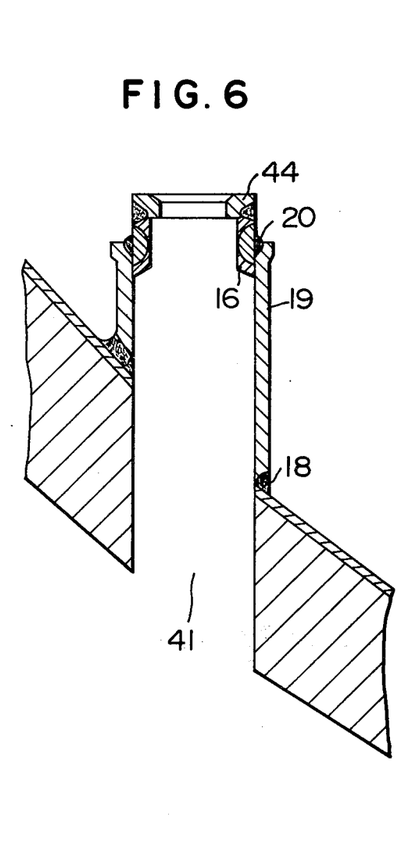
FIG. 6 shows the state after the removal of a part for the new CRD housing.

This sensitized region 21 is liable to be cracked due to the stress corrosion. Once the cracking is generated and developed, the coolant in the pressure vessel 9 in the reactor tends to leak through the gap between the CRD housing, and the stab tube 19 and the lower end plate 13 as shown by the arrows in FIG. 5.

Under this circumstance, the present invention aims at providing a method of repairing a CRD housing in which method, as disclosed in U.S. Ser. No. 23,902 filed Mar. 26, 1979, now U.S. Pat. No. 4,292,133, the control rod driving system 80 and other parts are removed from the CRD housing before the generation of the leakage, and the initial stage of cracking in the sensitized region, if any, is detected through an ultrasonic flaw detection, visual inspection by optic fibers and so forth. In the event of the occurrence of cracking, the defective part of the CRD housing is removed and replaced by a new CRD housing part made of an alloy steel having low carbon content.

Hereinafter, a preferred embodiment of the invention will be described with specific reference to FIGS. 5, 6, 7, 8 and 9.

Referring to these Figures a remote-controllable automatic cutting apparatus is inserted into the CRD housing 16 from the lower end of the latter to cut the same. As will be clearly seen from FIG. 9, the automatic cutting apparatus includes a micro-boring head 61, rotary transmission shaft 62, centering clamp 63 carrying an automatic centering and rotary spindle, centering guide 64, device 65 for preventing dropping of the CRD housing after cutting, and a vertically movable head 67 adapted to vertically locate the cutting tool by the operation of a drive motor 66. A diamond point tool 68 and a cutting-off tool 69 are attached to the micro-boring head 61 at 180° intervals to permit a smooth cutting with minimized cutting resistance. Two cutting tools 68, 69 are adapted to be automatically fed at a pitch of 0.05 mm/rev, by the revolution of the spindle 62. The touch surface of the centering clamp, i.e. the inner peripheral surface of the CRD housing, serves as the centering reference surface for the cutting apparatus, since the inner peripheral surface is made concentrically with the outer peripheral surface of the CRD housing. Thus, the undesirable cutting into the stab tube 19 is avoided by suitably presetting the cutting tool and adopting such a function of the micro-boring that the cutting feed is automatically stopped when the edge of the diamond point tool has reached the outer peripheral surface of the CRD housing i.e. when the cutting is completed.

Figure 9:
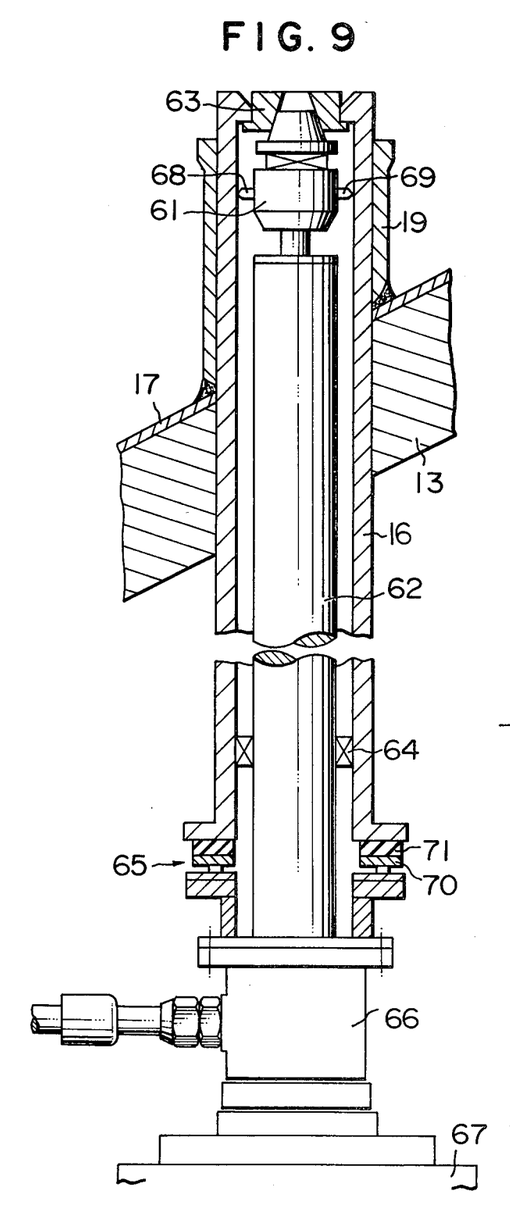
FIG. 9 illustrates an automatic cutting apparatus.

The device 65 for preventing dropping of the CRD housing after the cutting is constituted by a drop prevention support 70 and the cushion 71 which serves to absorb the impact in the event of a dropping.

Figure 10:
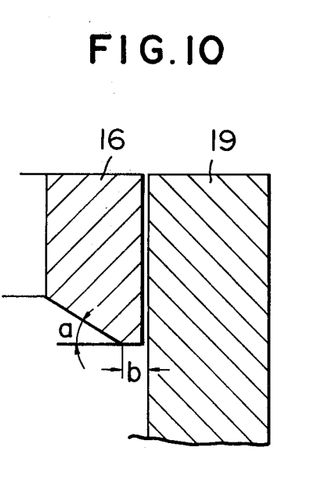
FIG. 10 shows a part of the weld groove formed by the automatic cutting apparatus shown in FIG. 9.

The cutting of the CRD housing is made at a portion of the CRD housing between the inconel weld 20 and the inner surface of the stainless steel padding 17 and surrounded by the stab tube 19. After the cutting, the portion of the CRD housing 16 located at the side of the end plate 13 is withdrawn from the lower end plate 13. As will be seen from FIG. 6, the remainder part of the CRD housing 16 is still secured to the pressure vessel 9 of the reactor through the stab tube 19. On the lower end of the remainder part of the CRD housing 16 secured to the pressure vessel 9, edge preparation is effected at the time of the cutting in such a manner as to form a part of a V-shaped groove having a bevel angle a of about 30° and a root face (b) of about 2 mm. FIG. 10 shows in section a part of the groove formed by this edge preparation.

Subsequently, a new CRD housing part 22 to be secured in place of the withdrawn one is inserted into the stab tube 19 through the bore 41 (See FIG. 6) in the lower end plate 13. At the upper end of the new CRD housing part 22, edge preparation is effected previously to form a part of the groove of bevel angle of about 30°, and the upper end is positioned to form a root gap of about 20 mm between itself and the lower end of the remainder CRD part 16. The lower end of the new CRD housing part 22 is supported by means of a fixing plate 26 attached to the lower ends of the adjacent CRD housings 16. The fixing plate 26 is fixed to the CRD housing part 22 by means of bolts 24 and nuts 25.

Figure 7:
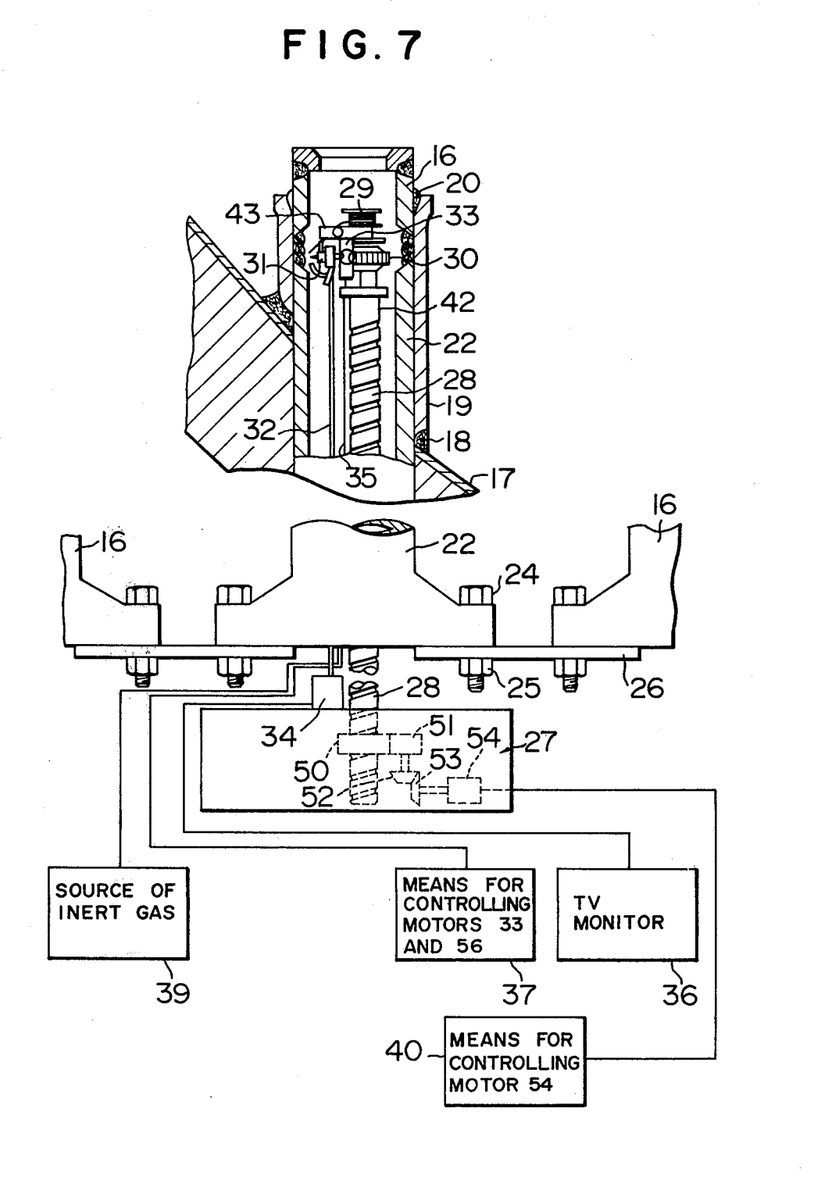
FIG. 7 shows the state of welding of a new part of the CRD housing.

An automatic welder 42 is driven into the CRD housing 22. The automatic welder 42 has a lifting gear 27 and a welding head 43. The lifting gear 27 is adapted to be secured to a platform (not shown) beneath the CRD housing, only during the work. The lifting gear 27 has a ball screw 28, ball nut 50 engaging with the ball screw 28 and a motor 54 for rotatively driving the ball nut 50. The welding head 43 includes a rotary table 55 adapted to move along a guide ring 30 provided at the upper end of the ball screw 28, wire feeding device 29 and a welding torch 31. The wire feeding device 29, welding torch 31 and the motors 33, 56 are mounted on the rotary table 55. A reference numeral 37 denotes a controller adapted for controlling the moving speed of the rotary table 55, i.e. the welding speed, as well as the speed of feed of the inconel wire, through the control of the motors 33 and 56. A reference numeral 40 designates a lift control device adapted for controlling the speed of the motor 54.

First of all, the automatic welder 42 is set such that the welding head 43 takes a position just under a CRD housing to be treated. Then, as the motor 54 is started, the torque of the motor is transmitted to bevel gears 53, 52, gear 51 and the ball nut 50. As a result of the rotation of the ball nut 50, the ball screw 28 is moved upwardly to make the welding head ascend within the CRD housing 22. The position of the welding head is observed by means of an image fiber 32 and a TV camera 34 which forms an image on a TV monitor 36. The motor 54 is made to stop at an instant at which the welding torch arrives at the predetermined welding position, i.e. at the position where it faces the groove formed between the CRD housing part 16 and the new CRD housing part 22. Then, the motor 33 is started simultaneously with the commencement of the welding, so that the rotary table 55 is moved along the guide ring 30. Namely, the rotary table 55 is moved as the torque of the motor 33 is transmitted to the pinion (not shown) provided on the rotary bed 55 and meshing with the rack of the guide ring 30. The filler wire is fed to the welding position by means of the wire feeding apparatus by the operation of the motor 56. During the welding, the welding torch 31 discharges inert gas to the welding region. The inert gas is supplied to the welding torch 31 through a hose in conduit 35 from a bomb 39. After the completion of the circumferential welding, the motor 54 is driven rotatively while the motor 33 is kept stopped, so that the ball screw 28 is moved slightly downwardly. In consequence, the welding torch 31 is moved downwardly to take a new position where is performed the welding over the entire circumference. This operation is repeated to successively perform the TIG welding. Although not shown, a mechanism mounted on the rotary table 55 drives the welding torch 31 in the radial direction of the guide ring 30. Then, after the completion of the entire circumferential welding, the motor 54 is driven to displace the ball screw 28 downwardly to withdraw the welding head 43 from the CRD housing.

As a result of this TIG welding, the CRD housing part 16, CRD housing part 22 and the stab tube 19 are integrally welded together in one piece. A reference numeral 38 designates a power supply source. The conduit 35 contains the hose from bomb 39, and wires from power supply 38 and controller 37. A suitable conventional coupling structure, not shown, is used between ball screw 28 and table 55 to connect the stationary part of wires, fiber and hose to movable parts on table 55. Preferably, the welding current during the welding is 80 to 200 A, arc voltage is 8 to 15 V and the welding speed is 40 to 200 mm/min. The welding wire used in this welding was an inconel alloy welding wire consisting essentially of, by weight, 0.02% C, 0.06% Si, 3.22% Mn, 19.00% Cr, 2.4% Fe, 0.01% Mo, 2.72% Nb, the balance Ni and inevitable impurities.

Also, the CRD housing part 22 is preferably made of a stainless steel which consists essentially of, by weight, 0.02% or less of C, 1.00% or less of Si, 2.00% or less of Mn, 0.045% or less of P, 0.030 or less of S, 10.00 to 14.00% of Ni, 16.00 to 18.00% of Cr, 2.00 to 3.00% of Mo, and the balance Fe and inevitable impurities.

Figure 8:
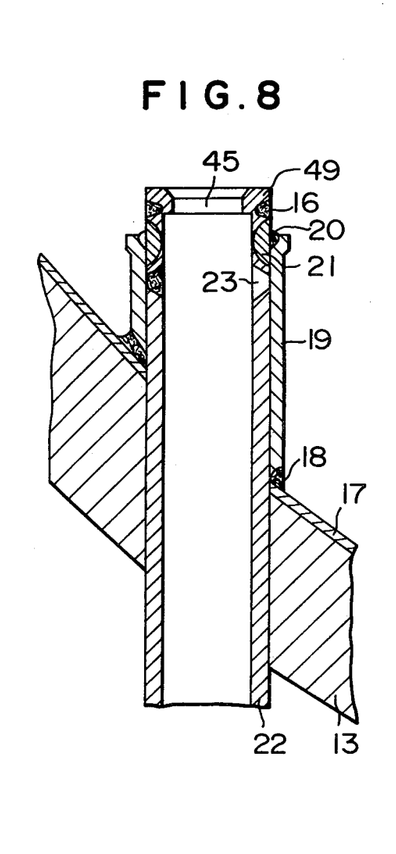
FIG. 8 shows the structure after the attaching of the new CRD housing.

FIG. 8 shows the state after the withdrawal of the welding head 43, subsequently to the completion of the welding. A suitable mechanical processing is conducted to smooth the bead surface between the CRD housing part and the CRD housing part 22.

As will be understood from the foregoing description, the method of the present invention permits the renewal of the CRD housing part while keeping a part of the old CRD housing part 16 and the stab tube 19 attached to the pressure vessel 9 of the nuclear reactor. Therefore, the replacement work can be finished in quite a simple manner and short period of time. The described embodiment is advantageous particularly in that it permits the replacement without necessitating the draining of the coolant from the pressure vessel 9.

Control rods are disposed in control rod guiding tubes which extend upwardly from a plate 44 fixed to the upper end of the CRD housing 16 into the core of the reactor. During the replacement of the CRD housing, the driving connection between the control rod driving system inserted in the CRD housing and the associated control rod is temporarily detached, and the control rod is supported by means of the plate 44. As will be seen from FIG. 4, the aperture 45 provided in the plate 44 is hermetically sealed by the lower end of the control rod 90 and housing 91 placed on the plate 44, so that the coolant in the pressure vessel 9 of the nuclear reactor does never flow out into the CRD housing 16.

According to the invention, therefore, it is possible to complete the replacement of the CRD housing in quite a short period of time.

What is claimed is:

1. A method of repairing the housing of a control rod driving system of a nuclear reactor, said housing being inserted through the wall of a pressure vessel of said reactor into a cylindrical sleeve secured to the inner surface of said vessel which housing is jointed by welding to said cylindrical sleeve, said method comprising the steps of:
   cutting said housing in the circumferential direction of the housing at a portion thereof positioned between the weld joint and the inner surface of said reactor vessel and surrounded by said cylindrical sleeve, thereby to divide said housing into a first housing part still secured to the weld joint and another removable housing part;
   removing said removable housing part;
   inserting a second housing part into said cylindrical sleeve through the wall of said nuclear reactor vessel; and
   uniting said first housing part and said second housing part by welding thereby to form a new housing for said control rod driving system.

2. A method of repairing the housing of a control rod driving system of a nuclear reactor, said housing being inserted through the wall of a pressure vessel of said reactor into a cylindrical sleeve secured to the inner surface of said vessel which housing is jointed by welding to said cylindrical sleeve, said method comprising the steps of:
   cutting said housing in the circumferential direction of the housing at a portion thereof positioned between the weld joint and the inner surface of said vessel and surrounded by said cylindrical sleeve, thereby to divide said housing into a first housing part still secured to the weld joint and another removable housing part;
   removing said removable housing part;
   inserting a second housing part into said cylindrical sleeve through the wall of said nuclear reactor vessel, and forming a weld groove defined between the cut end of said first housing part and the adjacent end of said second housing part; and
   effecting a welding on said groove to unite said first housing part, second housing part and said cylindrical sleeve, thereby to form a new housing of said control rod driving system.

3. A method of repairing the housing of a control rod driving system of a boiling water reactor, said housing being inserted through the lower end plate of the pressure vessel of said reactor into a cylindrical sleeve secured to the inner surface of said vessel which housing is jointed to said cylindrical sleeve by welding, said housing accommodating a control rod and a control rod driving member detachably connected to said control rod, said method comprises the steps of:
   detaching the connection between said control rod and said control rod driving member and removing the latter from said housing;
   cutting said housing in the circumferential direction of the housing at a portion thereof positioned between the weld joint and the inner surface of said lower end plate and surrounded by said cylindrical sleeve, thereby to cut said housing into a first housing part fixed to said weld joint and another removable housing part;
   removing said removable housing part;
   inserting a second housing part into said cylindrical sleeve through said lower end plate; and
   uniting said first housing part and said second housing part thereby to form a new housing for said control rod driving system.

4. A method of repairing the housing of a control rod driving system of a boiling water reactor, said housing being inserted through the lower end plate of the pressure vessel of said reactor into a cylindrical sleeve secured to the inner surface of said vessel which housing is jointed to said cylindrical sleeve by welding, said housing accommodating a control rod and a control rod driving member detachably connected to said control rod, said method comprises the steps of:
   detaching the connection between said control rod and said control rod driving member and removing the latter from said housing;
   cutting said housing in the circumferential direction of the housing at a portion thereof positioned between the weld joint and the inner surface of said lower end plate and surrounded by said cylindrical sleeve, thereby to divide said housing into a first housing part attaching to the weld joint and another removable housing part;
   removing said removable housing part;
   inserting a second housing part into said cylindrical sleeve through said lower end plate and forming a weld groove between the cut end of said first housing part and the adjacent end of said second housing part;
   effecting an inert gas arc welding at said groove to unit said first housing part, second housing part and said cylindrical sleeve thereby to form a new housing for the control rod driving system.

5. A method of repairing the housing of a control rod driving system as claimed in any one of claims 1 to 4, wherein said weld joint at which said first housing part is jointed to said cylindrical sleeve is provided at the axially inner end of said cylindrical sleeve.

6. A method of repairing the housing of a control rod driving system as claimed in any one of claims 1 to 4, wherein the cutting of said housing is effected in such a manner that the cut edge of said first housing part constitutes a portion of the welding bevel.

7. A method of repairing the housing of a control rod driving system as claimed in any one of claims 1 to 4, wherein said second housing part is made of a stainless steel consisting essentially of, by weight, 0.02% or less of C, 1.00% or less of Si, 2.00% or less of Mn, 0.045% or less of P, 0.030% or less of S, 10.00 to 14.00% of Ni, 16.00 to 18.00% of Cr, 2.00 to 3.00% of Mo, and the balance Fe and inevitable impurities.

8. A method of repairing the housing of a control rod driving system as claimed in any one of claims 1 to 4, wherein the welding wire used in the welding is an alloy welding wire consisting essentially of, by weight, 0.02% C, 0.06% Si, 3.22% Mn, 19.00% Cr, 2.4% Fe, 0.01% Mo, 2.72% Nb, and the balance Ni and inevitable impurities 9. A method of repairing the housing of a control rod driving system as claimed in any one of claims 1 to 4, where said previously mentioned steps are performed after determining the likelihood of the occurrence of stress corrosion cracking in said housing that is provided of stainless steel as caused by the generation of chromium lacking layer along the HAZ crystal boundary by said welding, the presence of high tensile stress in excess of 0.2% of the yield strength of the stainless steel in said boundary and the presence of a corrosive environment; and wherein said step of uniting bonds the entire periphery of said second housing part to said cylindrical sleeve by welding.

* * * * *